United States Patent [19]

Rostin et al.

[11] Patent Number: 4,619,354
[45] Date of Patent: Oct. 28, 1986

[54] PRESSURE PLATE FOR A MOTOR VEHICLE FRICTION CLUTCH

[75] Inventors: Günther Rostin, Schweinfurt; Erich Scheer, Prosselsheim; Dieter Kolb, Bad Kissingen; Karl H. Werner, Schweinfurt, all of Fed. Rep. of Germany

[73] Assignee: Fichtel & Sachs AG, Schweinfurt, Fed. Rep. of Germany

[21] Appl. No.: 638,863

[22] Filed: Aug. 7, 1984

[30] Foreign Application Priority Data

Aug. 11, 1983 [DE]· Fed. Rep. of Germany ....... 3329038

[51] Int. Cl.[4] .................... F16D 13/46; F16D 13/71
[52] U.S. Cl. ................ 192/89 B; 192/70.27
[58] Field of Search ................ 192/70.27, 89 B

[56] References Cited

U.S. PATENT DOCUMENTS

| 3,712,436 | 1/1973 | Rist ................................ 192/89 B |
| 4,211,315 | 7/1980 | Fenart ........................... 192/70.27 |

FOREIGN PATENT DOCUMENTS

| 0049058 | 4/1982 | European Pat. Off. . |
| 1255406 | 11/1967 | Fed. Rep. of Germany . |
| 1260890 | 2/1968 | Fed. Rep. of Germany .... 192/89 B |
| 2306255 | 8/1973 | Fed. Rep. of Germany .... 192/89 B |
| 2161432 | 5/1980 | Fed. Rep. of Germany . |
| 43-24602 | 2/1965 | Japan ............................. 192/89 B |
| 44-31003 | 9/1966 | Japan ............................. 192/89 B |
| 1003340 | 9/1965 | United Kingdom . |
| 1180856 | 2/1970 | United Kingdom . |
| 1213918 | 11/1970 | United Kingdom .......... 192/89 B |
| 1270800 | 4/1972 | United Kingdom . |
| 1357272 | 6/1974 | United Kingdom . |
| 1355824 | 6/1974 | United Kingdom . |
| 1583403 | 1/1981 | United Kingdom . |

Primary Examiner—Allan D. Herrmann
Attorney, Agent, or Firm—Toren, McGeady, Stanger, Goldberg & Kiel

[57] ABSTRACT

The pressure plate for a motor vehicle friction clutch comprises a clutch cover, a non-rotatable but axially displaceable presser plate and a diaphragm spring which is supported in the region of its external circumference on the presser plate and on a smaller diameter on the clutch cover. Securing elements retained on the clutch cover pass through openings of the diaphragm spring and hold the diaphragm spring between the two wire rings, of which the wire ring placed on the side of the presser plate is axially undulated. The regions of the wire ring which form undulation crests in relation to the diaphragm spring extend below the support faces of the securing elements. A projection is formed by bending or as additional part on the wire ring and fixes the wire ring non-rotatably.

16 Claims, 14 Drawing Figures

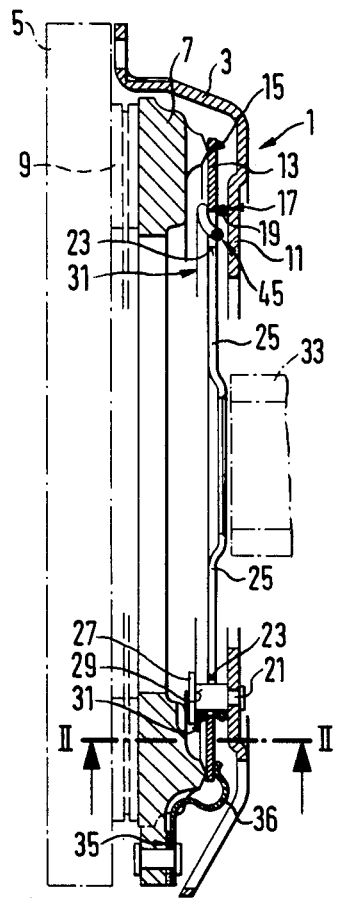
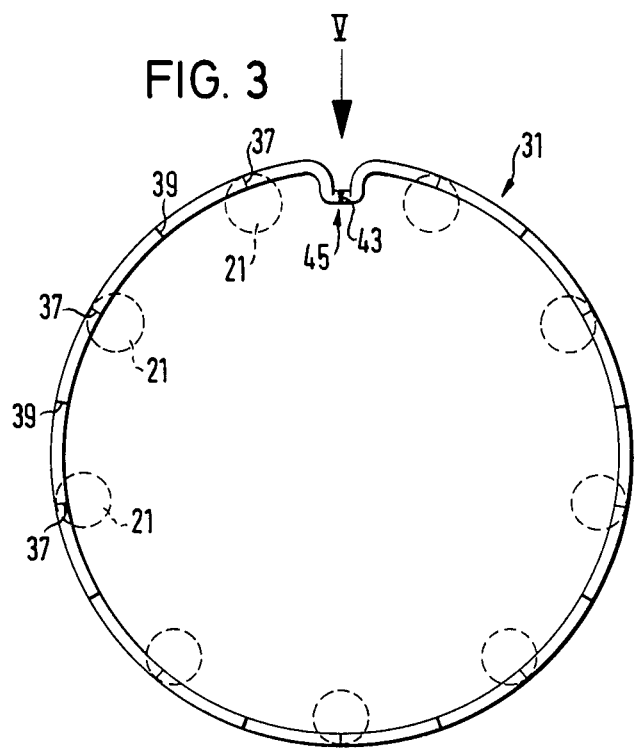
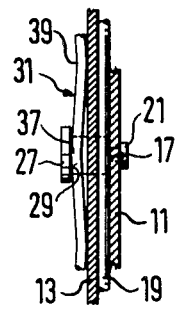
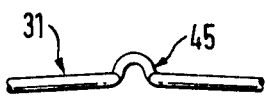
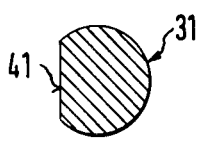
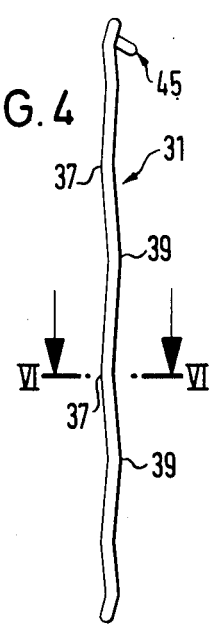

PRESSURE PLATE FOR A MOTOR VEHICLE FRICTION CLUTCH

BACKGROUND OF THE INVENTION

The invention relates to a pressure plate for a motor vehicle friction clutch, particularly of a kind comprising a clutch cover, a presser plate arranged non-rotatably but axially displaceably in relation to the clutch cover, a diaphragm spring of substantially annular disc form which is provided with radially inwardly protruding spring tongues and which is supported on the presser plate in the region of its external circumference and on its side axially remote from the presser plate is supported on the clutch cover along a circle radially within the external circumference, a plurality of securing elements held on the clutch cover and staggered in relation to one another in the circumferential direction of the support circle, which pass through openings each of the diaphragm spring and comprise shoulders pointing axially to the diaphragm spring in the region of the support circle on the side of the presser plate, and an axially undulatory wire ring substantially following the support circle, which is clamped in axially resiliently with initial stress between the diaphragm spring and the shoulders of the securing elements.

STATEMENT OF PRIOR ART

A pressure plate for a motor vehicle friction clutch is known from German Patent No. 1,255,406 in which a diaphragm spring of substantially annular disc form is arranged axially between a clutch cover and a presser plate guided non-rotatably but axially displaceably in relation to the clutch cover. The diaphragm spring is supported in the region of its external circumference on the presser plate, and on its side axially remote from the presser plate it is supported on the clutch cover along a circle placed radially within the external circumference. On the clutch cover there are provided several securing elements in the form of flange rivets, offset in the circumferential direction of the support circle in relation to one another, which pass through openings of the diaphragm spring and on the side of the presser plate have shoulders formed by their heads and pointing to the diaphragm spring. The diaphragm spring is seated between two axially undulatory, initially stressed wire rings. The undulatory wire rings are intended to reduce whirring noises of the clutch and the wear of the diaphragm spring and its supporting.

From German Publication Specification No. 2,161,432 a motor vehicle friction clutch is known in which the wire rings arranged between the diaphragm springs and the flange rivets coming through the diaphragm spring are provided in the region of the rivet heads with formed-on portions. The formed-on portions form shoulders pointing in the circumferential direction which are intended to prevent the rotation of the wire ring in relation to the other parts of the clutch.

It has appeared that pressure plates of the known kind are unsuitable for internal combustion engines with comparatively strong drive-output vibrations, since the wire rings used therein have a frequently inadequate life.

OBJECT OF THE INVENTION

An object of the invention is to improve the wire rings used for supporting the diaphragm spring so that they have a long life and the wear of the diaphragm spring support system is slight.

SUMMARY OF THE INVENTION

According to the invention there is provided a pressure plate for a motor vehicle friction clutch comprising a clutch cover, a presser plate arranged non-rotatably but axially displaceably in relation to the clutch cover, a diaphragm spring of substantially annular disc form which is provided with radially inwardly protruding spring tongues and which is supported on the presser plate in the region of its external circumference and on its side axially remote from the presser plate is supported on the clutch cover along a circle radially within the external circumference. A plurality of securing elements held on the clutch cover and staggered in relation to one another in the circumferential direction of the support circle pass through openings each of the diaphragm spring and comprise shoulders pointing axially to the diaphragm spring in the region of the support circle on the side of the presser plate. An axially undulatory wire ring substantially following the support circle is clamped in axially resiliently with initial stress between the diaphragm spring and the shoulders of the securing elements. The improvement is to be seen in that the wire ring comprises at least one projection formed by bending or from a part additionally secured to it, which co-operates with a stop face of at least one of the securing elements or of the diaphragm spring for securing the wire ring against rotation, and in that the wire ring held non-rotatably by means of the projection is of such undulatory form that it abuts on the shoulders of the securing elements exclusively with its regions which form undulation crests in the unstressed condition in relation to the diaphragm spring.

Since the projection preventing the rotation is bent out of the wire material or fitted additionally on the wire material, the wire ring has no notches which would increase the danger of fracture. The projection is provided so that the wire ring is supported exclusively with its undulation crests on the securing elements and correspondingly with its undulation troughs on the diaphragm spring, and accordingly the maximum axial spring travel can be exploited. Furthermore the object is thus achieved that the supporting forces can be introduced into the wire ring uniformly and without points of substantial instability, at defined points, which lengthens the life.

In order to reduce the pressure per unit area between the shoulders of the securing elements, preferably formed as flange rivets, and the wire ring, the wire ring is provided in a preferred embodiment with a flattening over its entire ring circumference on its side facing the shoulders. A flattening of this kind has the advantages that it forms no instabilities or notches and, in the case of wire rings produced from lengths of wire, can be formed on the still straight wire material before the closing of the ring.

The wire rings are produced preferably by welding of the free ends of a wire length to one another. In so far as the projection engages in an opening of the diaphragm spring, the projection is produced preferably by bending over and welding of the free ends of the wire length bent into a ring. If arcuate bent portions lying in the plane of the wire ring are formed on the wire ring and are supported on the securing elements, especially the flange rivets, the weld is expediently placed between a crest and a trough of the undulation, in order that the loading acting upon the weld may be kept minimal.

In the securing of the wire rings against rotation with the aid of the securing elements the arcuate bent-off portions lying in the plane of the wire ring can be provided in pairs on both sides of the securing element or extend in the interspace between two adjacent securing elements. The arcuate bent-off portions are preferably flattened off on the side of the diaphragm spring obliquely of the latter, without however attenuating the maximum diameter of the wire material by the flattening. In this way the diaphragm spring can tilt about the wire ring without the point of application shifting radially substantially.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 shows an axial longitudinal section through a pressure plate of a motor vehicle friction clutch;

FIG. 2 shows a detail view of the pressure plate seen along a line II—II in FIG. 1;

FIG. 3 shows an axial plan view of an axially undulatory wire ring of the pressure plate according to FIG. 1, seen from the side of its presser plate;

FIG. 4 shows a lateral elevation of the wire ring according to FIG. 3;

FIG. 5 shows a detail view of the wire ring seen in the direction of an arrow V—V in FIG. 3;

FIG. 6 shows a cross section through the wire ring seen along a line VI—VI in FIG. 4;

DESCRIPTION OF PREFERRED EMBODIMENTS

Figure 7:
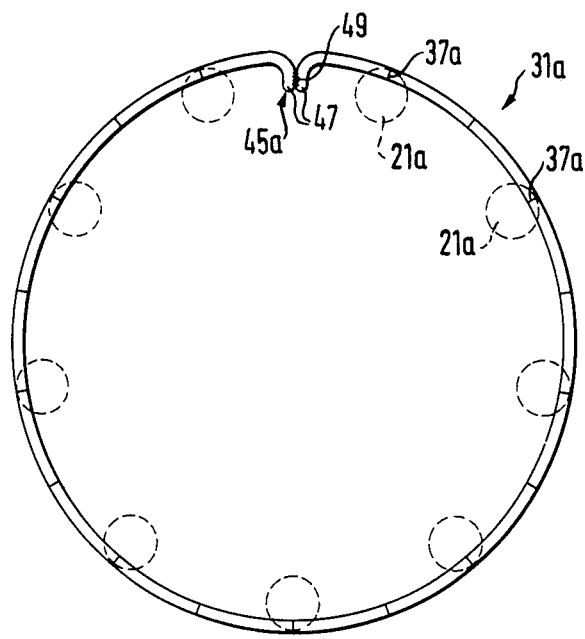
FIG. 7 shows an axial plan view of a second embodiment of an axially undulatory wire ring usable in the pressure plate according to FIG. 1.

FIG. 1 shows in solid lines a pressure plate unit, designated by 1, of a motor vehicle friction disc clutch. The pressure plate unit 1 comprises a clutch cover 3 which is secured, for example screwed, in a manner not further illustrated, to a flywheel 5, entered in dot-and-dash lines, of an internal combustion engine. The clutch cover 3 encloses a presser plate 7. A clutch disc 9 provided in the usual way with friction linings and seated non-rotatably but axially displaceably on a gear input shaft is arranged axially between the presser plate 7 and the flywheel 5. On the side of the presser plate 7 axially remote from the flywheel 5 the clutch cover 3 grasps radially with an annular flange 11 around the presser plate 7. Axially between the annular flange 11 and the presser plate 7 there is arranged a diaphragm spring 13 of substantially annular disc form which is supported in the region of its external circumference along a support circle 15 on the presser plate 7. Radially within the support circle 15 the diaphragm spring 13 on a support circle 17 having a diameter smaller than that of the support circle 15, bears through a wire ring 19 on the annular flange 11 of the clutch cover 3. Several flange rivets 21 are secured on the annular flange 11 of the clutch cover 3 at equal angular intervals in the circumferential direction radially within the support circle 17. The flange rivets 21 pass through foot openings 23 on the base of radially inwardly protruding spring tongues 25 of the diaphragm spring 13. The flange rivets 21 hold the diaphragm spring 13 non-rotatably on the clutch cover 3. The free ends, adjacent to the presser plate 7, of the flange rivets 21 carry heads 27, each of which, at least in its radially outer region, forms a shoulder 29 pointing axially to the diaphragm spring 13. A wire ring 31, explained in greater detail below, like the wire ring 19, encloses all the flange rivets 21 on their radially outer side along the support circle 17. The diaphragm spring 13 is installed so that when the spring tongues 25 are unloaded it initially stresses the presser plate 7 against the flywheel 5 and thus clamps in the clutch disc 9 between itself and the flywheel 5 in frictionally engaging manner. At 33 a clutch releaser is indicated by means of which the spring tongues 25 of the diaphragm spring 13 can be pressed towards the flywheel 5 and thus the clutch can be disengaged. In the release of the clutch a change of abutment takes place in the region of the support circle 17, in which the diaphragm spring 13, which is supported through the wire ring 19 when the clutch is engaged, places itself against the wire ring 31.

The presser plate 7 is guided on the clutch cover 3 or the flywheel 5 in the usual way with the aid of axially elastic links 35, for example with the aid of tangential straps. Springs 37 connect the presser plate 7 axially elastically with the diaphragm spring 13 and ensure a positive lift-away of the presser plate 7 in the release of the clutch.

In place of the flange rivets 21 it is also possible to provide tabs or the like bent out of the clutch cover 3. Furthermore in place of the wire ring 19 it is also possible to form on the clutch cover 3 a corrugation or the like extending along the support circle 17.

The axial play of the diaphragm spring 13 in the region of the support circle 17 should be as small as possible since this play increases the idle travel of the spring tongues 25. The clamp-in force exerted by the wire rings 19, 31 must be very high, since it must overcome the heavily initially stressed diaphragm spring 13 for the change of abutment in the engagement and disengagement of the clutch. Especially the wire ring 31 is subjected to heavy wearing loading. In order to reduce the wear the wire ring 31, as shown best by FIGS. 2 and 4, is made as an axially undulatory wire ring and comprises, in relation to the diaphragm spring 13, undulation crests 37 and troughs 39 succeeding one another in the circumferential direction. The wire ring 31 rests with the undulation troughs against the diaphragm spring. The undulation crests 37 are each held with axially resilient initial stress under the shoulder 29 of one of the flange rivets 21. Thus the number of undulation crests 37 is equal to the number of the flange rivets 21 or amounts to an integral multiple thereof.

The wire ring 31 consists of wire material with substantially circular cross-section, which however is provided over its entire length with a flattening 41 (FIG. 6). The flattening 41 rests on the shoulders 29 of the flange rivets 21 and reduces the pressure per unit area. Flattenings 41 of this kind can be formed at favorable cost on the extended wire material before the ring is closed. Furthermore notches are avoided which otherwise would increase the danger of fracture.

The two ends of the wire material length bent into the wire ring 31 are bent in Z-form towards one another and butt-welded with one another by a weld seam 43, forming a projection 45 protruding inwards obliquely of the axis of rotation of the clutch. As FIG. 1 shows, the projection engages in one of the foot openings 23 of the diaphragm spring 13 between two adjacent spring tongues 25.

In this way the wire ring 31 is fixed non-rotatably in relation to the flange rivets 21. The weld seam 43 lies in the plane of symmetry of the bent-over projection 45 and thus at a less loaded part of the wire ring 31.

In FIG. 7 a wire ring 31a is represented which differs from the wire ring 31 merely in the configuration of its projection 45a formed by bending for securing in rotation. Here as also in the following description therefore parts of like effect are to be designated with like reference numerals but additionally with the letter a. For further explanation reference is made to the description of FIGS. 1 to 6.

The wire ring 31a is again axially undulated, its undulation crests 37a being arranged each at the location of the flange rivets 21a. The projection 45a again protrudes radially inwards obliquely of the rotation axis of the clutch and consists of two mutually parallel bent-off ends 47 of a wire material length which are secured to one another by a weld seam 49.

Figure 8:
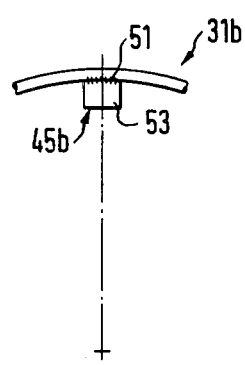
FIG. 8 shows a detail of an axial plan view of a third embodiment of an axially undulatory wire ring usable in the pressure plate according to FIG. 1.
Figure 9:
FIG. 9 shows a lateral elevation of the wire ring according to FIG. 8.

FIGS. 8 and 9 show a further variant of an axially undulating wire ring 31b which is usable in a pressure plate unit according to FIG. 1. The wire ring 31b differs from the wire ring 31 solely in its projection 45b serving for securing in rotation, which consists of a sheet metal tab 53 welded on by a weld seam 51 along one of its edges extending in the circumferential direction of the ring. For further explanation of the assembly and manner of operation of the pressure plate unit equipped with the wire ring 31b, reference is made to the explanation of FIGS. 1 to 6.

Figure 10:
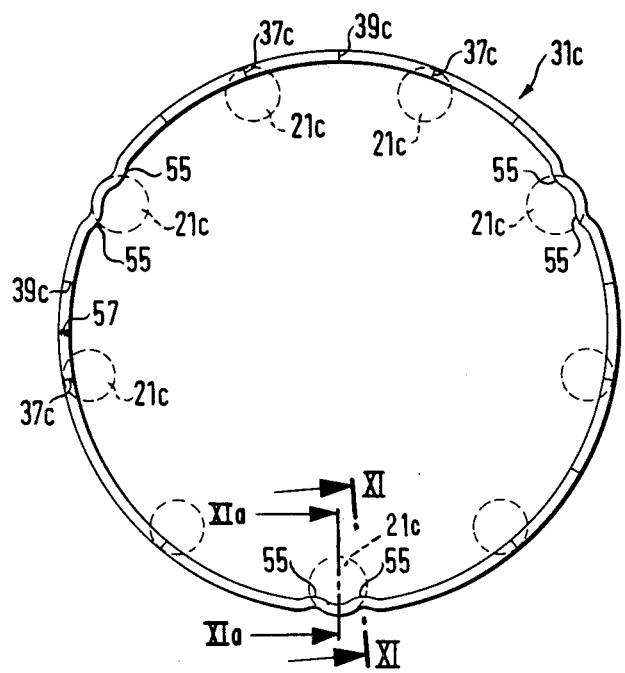
FIG. 10 shows an axial plan view of a fourth embodiment of an axially undulatory wire ring usable in the pressure plate according to FIG. 1.
Figure 11:
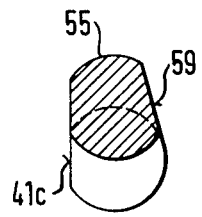
FIG. 11 shows a sectional view of the wire ring, seen along a line XI—XI in FIG. 10.

FIGS. 10 and 11 show details of an axially undulating wire ring 31c which is usable in place of the wire ring 31 in the otherwise unaltered pressure plate unit according to FIG. 1. Like parts are therefore designated with like reference numerals with the addition of the letter c, and for further explanation reference is made to the description of FIGS. 1 to 6.

The wire ring 31c is provided with undulation crests 37c at the locations of the flange rivets 21c and troughs 39c therebetween, in alternating succession. For securing the wire ring 31c against rotation arcuate bent-off portions 55 are provided on both sides of flange rivets 21c at several, here three, locations staggered at equal angular intervals from one another in the circumferential direction, which portions 55 extend radially inwards substantially in the plane of the wire ring 31c and enclose the shanks of the flange rivets 21 on surface sections lying oppositely in the circumferential direction. Between adjacent bent-off portions 55 the wire ring 31c proceeds along the support circle, both in the region of the flange rivets 21c and between adjacent flange rivets.

Figure 11A:
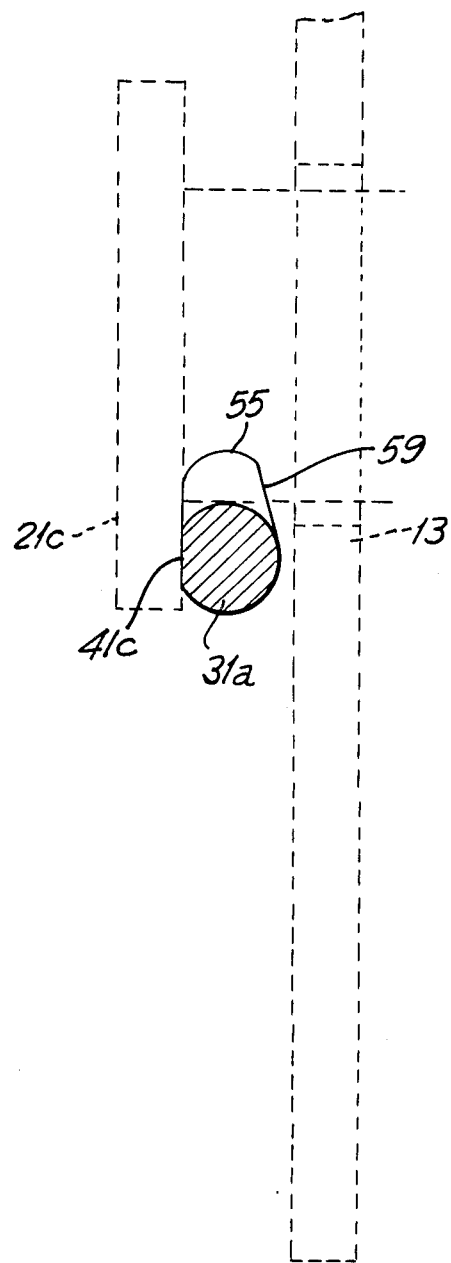
FIG. 11a shows a sectional view of the wire ring similar to FIG. 11 located between a rivet and the diaphragm spring with the section taken along line XIa—XIa in FIG. 10.

The wire ring 31c consists of a wire material section the ends of which are butt-welded to one another in a weld seam 57. To reduce the loading of the weld seam 57 it lies between an undulation crest 37c and an undulation trough 39c. The wire material section is provided over its whole length on its side axially facing the shoulders of the flange rivets 21c with a flattening 41c corresponding to the flattening 41 in FIG. 6 and correspondingly also extending along the arcuate bent-off portions 55. In order not to hinder the movement of the diaphragm spring tongues in the release of the clutch, the arcuate bent-off portions 55 are provided on their side axially facing the diaphragm spring with a plane flattening 59 which extends radially inwardly obliquely of the plane of the wire ring 31c approximately tially to the cross-sectional contour of the regions of the wire ring adjoining the bent-off portions 55 in the circumferential direction and extending on the support circle. Note FIG. 11a illustrating the wire ring 31a between adjacent bent-off portions 55 with the flange rivet 21c shown in contact with the flattening 41c on one side and the diaphragm spring 13 shown on the other side of the wire ring adjacent the plane flattening 59. The flange rivet 21c and the diaphragm spring 13 are shown in phantom in FIG. 11a.

Figure 12:
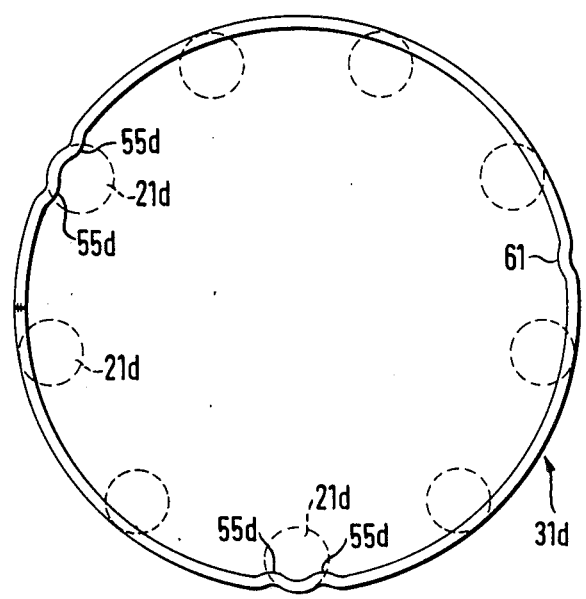
FIG. 12 shows an axial plan view of a first variant of the wire ring according to FIG. 10.

FIG. 12 shows a variant, designated by 31d, of the wire ring 31c as illustrated in FIGS. 10 and 11. The wire ring 31d differs from the wire ring 31c only in the number of its arcuate bent-off portions 55d, of which only two pairs are provided for securing the wire ring 31d against rotation. The bent-off portions 55d are otherwise made the same as the bent-off portions 55.

In order to ensure that the wire ring 31d is always installed in the same position of installation in relation to its undulation crests and troughs in the pressure plate unit in FIG. 1, the fact is utilised that an uneven number of flange rivets 21d at equal angular intervals from one another is present. Diametrically opposite to one of the flange rivets 21d the wire ring 31d is provided with an arcuate bent-off portion 61 protruding inwards radially between two flange rivets 21d in the plane of the wire ring 31d. The bent-off portion 61 forms a marking which renders possible an orientation of installation and reduces the number of possible incorrect installation positions, since the bent-off portion 61 collides with the shanks of the flange rivets 21d in a plurality of positions of installation. Furthermore the bent-off portion 61 is arranged with differing circumferential interval, that is asymmetrically of the two pairs of arcuate bent-off portions 55d. On its side facing the diaphragm spring axially the bent-off portion 61 is provided with a flattening corresponding to the flattening 59 in FIG. 11.

Figure 13:
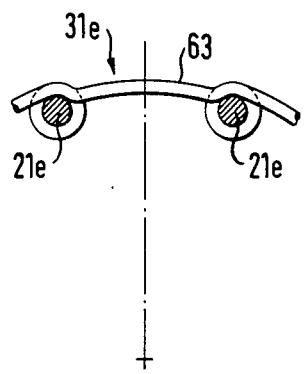
FIG. 13 shows a detail of an axial plan view of a second variant of the wire ring according to FIG. 10.

FIG. 13 shows a further variant of an axially undulatory wire ring 31e which is usable with the otherwise unmodified pressure plate according to FIG. 1. The wire ring 31e is provided for rotation securing with bent-off portions 63 which engage in the plane of the wire ring 31e between two adjacent flange rivets 21e. The flange rivets 21e, which correspond to the flange rivets 21 explained with reference to FIGS. 1 to 6, hold the axially undulatory wire ring 31e both axially and in the circumferential direction in the region of the undulation crests. The bent-off portion 63 at the same time forms an axial undulation trough between adjacent undulation crests. The wire ring 31e is again provided over its entire length with a flattening similar to the flattening 41 and in the region of the flange rivets 21e with flattenings similar to the flattenings 59 as explained with reference to FIG. 11.

In all the embodiments explained above, also the wire ring 19 arranged between the diaphragm spring 15 and the annular flange 11 of the clutch cover 3 can be formed as an axially undulated wire ring, similar to the wire ring 31. As the wire ring 19 abuts axially on both sides thereof on surfaces which extend over its entire circumference, its position of installation relative to the flange rivets 21 does not matter. It is however preferably provided that the wire ring 19 is axially plane or is replaced by an axially plane corrugation of the annular flange 11. The wire ring 19, too, can be held, secured against rotation, on the flange rivets or the diaphragm spring or the annular flange 11. For this purpose it can be provided with projections, as explained with reference to FIGS. 2 to 9, or radial bent-off portions, as explained in connection with FIGS. 1 to 13.

While specific embodiments of the invention have been shown and described in detail to illustrate the application of the inventive principles, it will be understood that the invention may be embodied otherwise without departing from such principles.

We claim:

1. In a pressure plate for a motor vehicle friction clutch comprising
   (a) a clutch cover,
   (b) a presser plate arranged non-rotatably but axially displaceably in relation to the clutch cover,
   (c) a diaphragm spring of substantially annular disc form which is provided with radially inwardly protruding spring rongues, said diaphragm spring being supported on the presser plate in the region of its external circumference and on its side axially remote from the presser plate being supported on the clutch cover along a circle radially within the external circumference,
   (d) a plurality of securing elements held on the clutch cover and staggered in relation to one another in the circumferential direction of the support circle, said securing elements passing through openings in the diaphragm spring and comprising shoulders facing axially toward the diaphragm spring in the region of the support circle on the side of the presser plate,
   (e) an axially undulatory wire ring substantially following the support circle and being clamped axially resiliently with initial stress between the diaphragm spring and the shoulders of the securing elements, said wire ring having alternating crests and troughs extending in the axial direction of said diaphragm spring, said wire ring including means for securing the wire ring against rotation in the circumferential direction, and said undulatory wire ring being shaped so that it abuts on the shoulders of the securing elements exclusively in the regions of said undulation crests in the unstressed condition in relation to the diaphragm spring.

2. Pressure plate according to claim 1, wherein the wire ring comprises, on the side facing the shoulders of the securing elements, a flattening extending over the entire circumference of the ring.

3. Pressure plate according to claim 1, wherein the number of the undulation crests is equal to or an integral multiple of the number of the securing elements.

4. Pressure plate according to claim 1, wherein the wire ring consists of a length of wire bent into a ring and with its ends welded to one another.

5. Pressure plate according to claim 4, wherein the ends of the wire length are butt-welded to one another between an undulation crest and an undulation trough.

6. Pressure plate according to claim 4, wherein said means comprises that the ends of the wire length are bent over parallel with one another in the same direction transversely of the circumferential direction of the wire ring and are welded with one another in the longitudinal direction of the wire for the formation of the projection.

7. Pressure plate according to claim 4, wherein said means comprises that the ends of the wire length, are bent towards one another in Z-form transversely of the circumferential direction of the wire ring and butt-welded with one another.

8. Pressure plate according to claim 4, wherein said means is formed as a sheet-metal tab welded to the wire ring.

9. Pressure plate according to one of claims 1 to 8, wherein the wire ring encloses the securing elements on the radially outer side and and said means comprises a projection protruding inwardly one of axially and obliquely of the axial direction and engages in an opening of the diaphragm spring.

10. Pressure plate according to claim 9, wherein said means comrpises a projection engaging between two adjacent spring tongues of the diaphragm spring in a rounded-out foot portion of the spring tongues.

11. Pressure plate according to claim 1, wherein said means comprises projections formed by arcuate bent-off portions of the wire ring which lie substantially in the plane of the wire ring and abut on opposite sides, in the circumferential direction, of at least one of the securing elements.

12. Pressure plate according to claim 11, wherein the wire ring encloses the securing elements on the radially outer side and said means comprises that in the circumferential direction a radially inwardly projecting arcuate bent-off portion on each of the two sides engages at least one of the securing elements.

13. Pressure plate according to claim 11, wherein the wire ring encloses the securing elements on the radially outer side and said means comprises that in the circumferential direction between two adjacent securing elements an arcuate bent-off portion engages radially inwards between two securing elements.

14. Pressure plate according to claim 11, wherein each of the bent-off portions is provided in the region of the securing elements on the side of the wire ring axially facing the diaphragm spring with a flattening adjoining the wire contour of the wire ring substantially tangentially in its radially outer region and otherwise extending radially inwards obliquely of the plane of the wire ring.

15. Pressure plate according to claim 11, wherein an uneven number of securing elements arranged at equal angular distances from one another is provided and wherein the wire ring comprises, opposite diametrically to one of the securing elements, an additional arcuate bent-off portion engaging between two adjacent securing elements and protruding in the same radial direction as the first-mentioned bent-off portion.

16. Pressure plate according to claim 15, wherein for the securing of the wire ring against rotation bent-off portions for rotation securing are provided on two securing elements and wherein the additional bent-off portion is at a different distance in the circumferential direction from these securing elements.

* * * * *